N. H. ANDERSON.
TYPE WRITING MACHINE.
APPLICATION FILED OCT. 8, 1909.
1,312,820.
Patented Aug. 12, 1919.
11 SHEETS—SHEET 1.
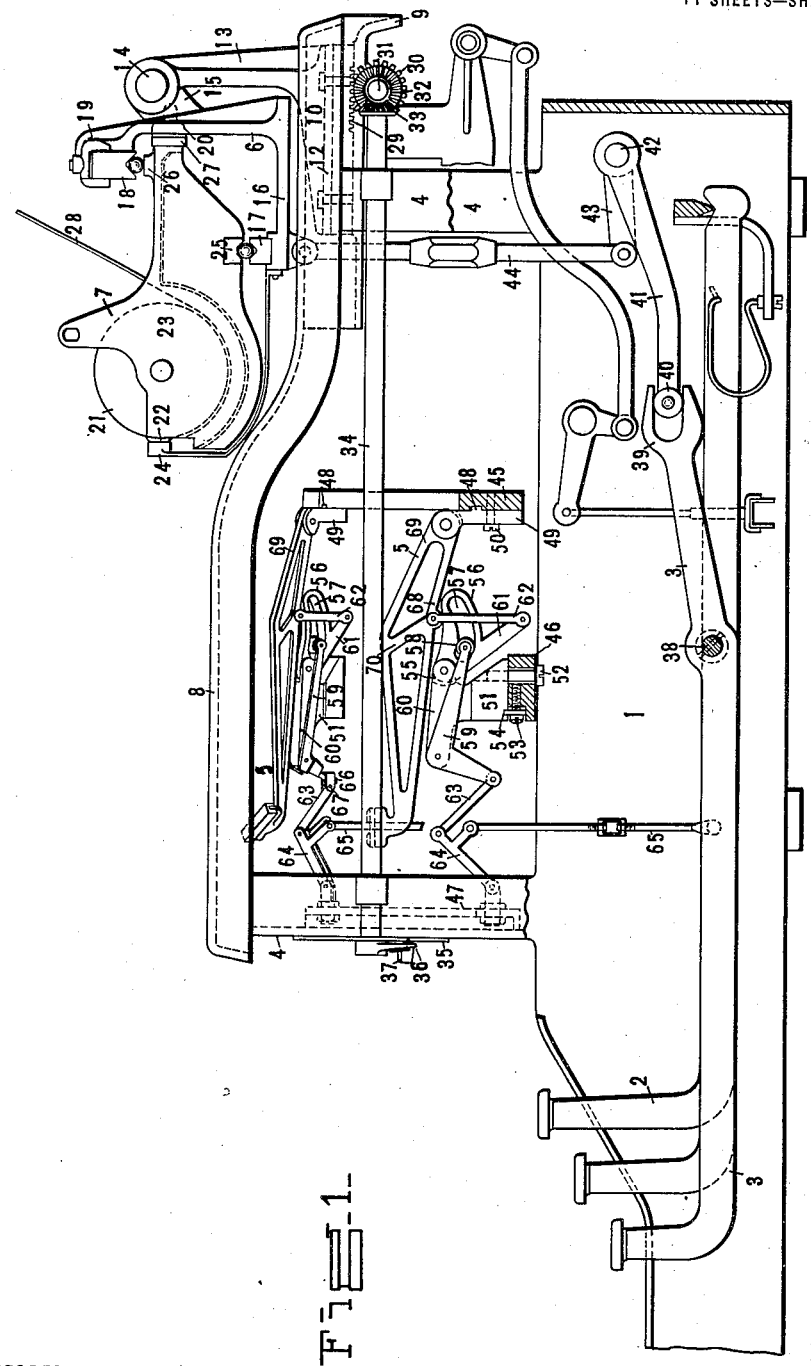
WITNESSES
INVENTOR
N. H. Anderson
BY
Duell, Warfield & Duell
ATTORNEYS

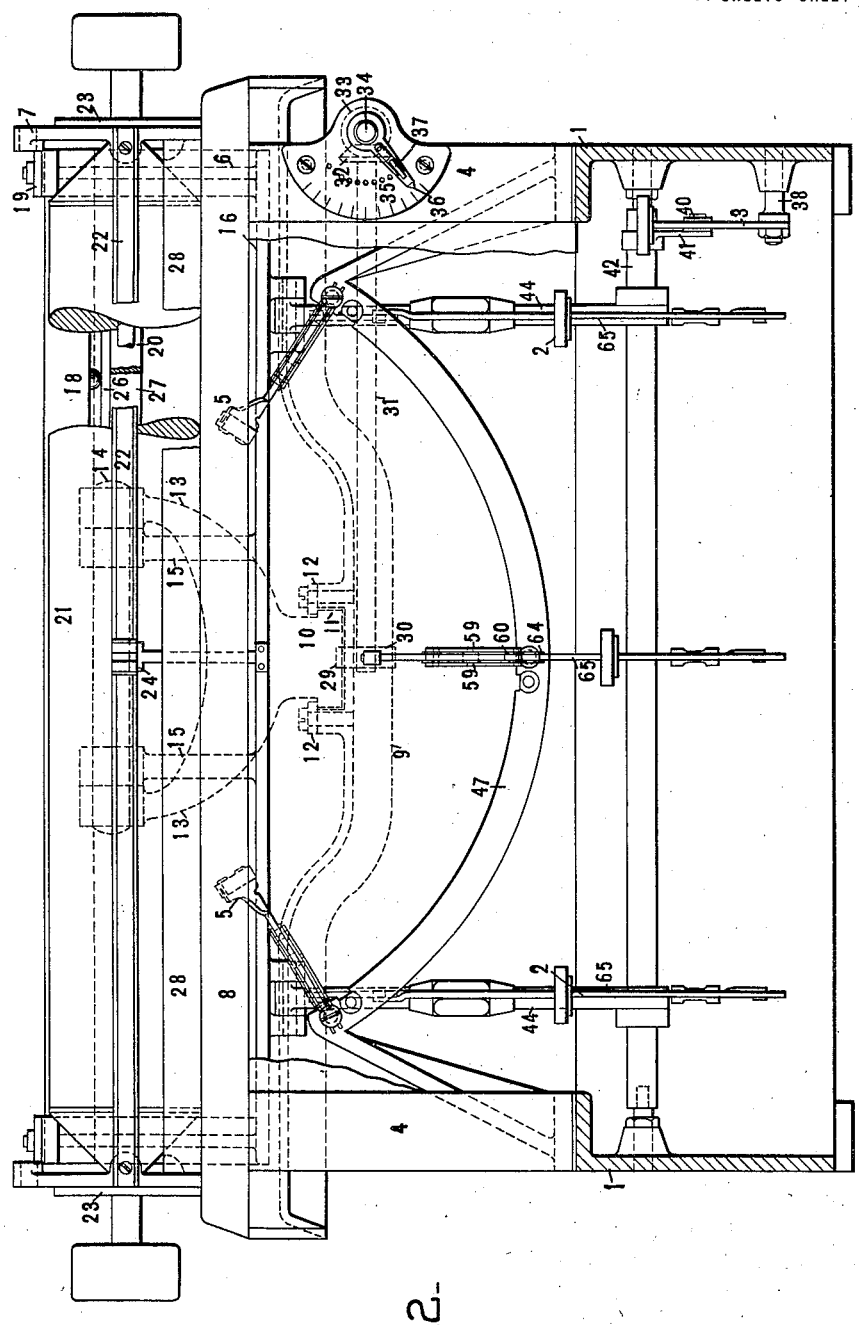

N. H. ANDERSON.
TYPE WRITING MACHINE.
APPLICATION FILED OCT. 8, 1909.
1,312,820.
Patented Aug. 12, 1919.
11 SHEETS—SHEET 3.
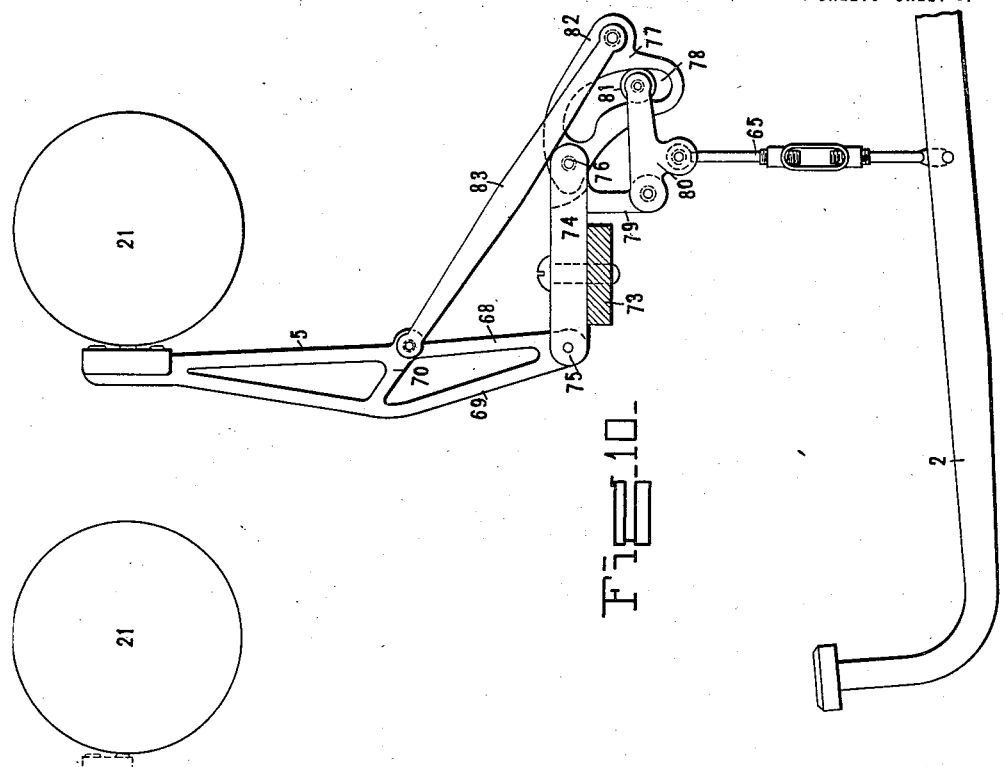
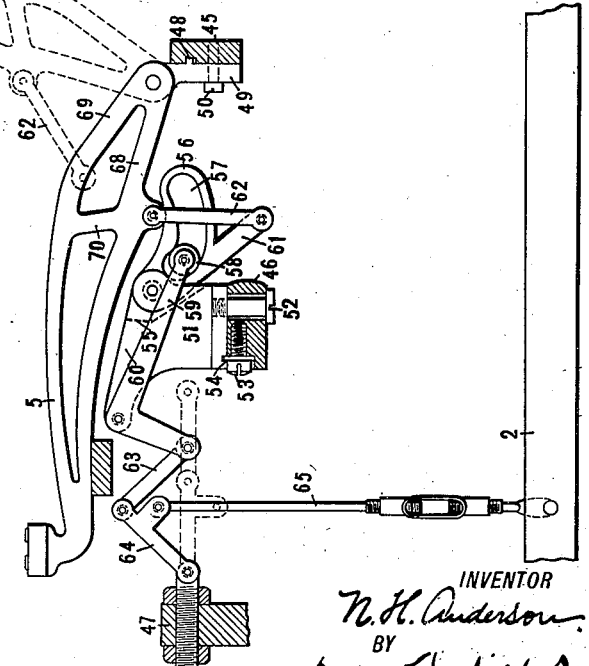
WITNESSES
INVENTOR
N. H. Anderson
BY
Duell, Warfield & Duell
ATTORNEYS

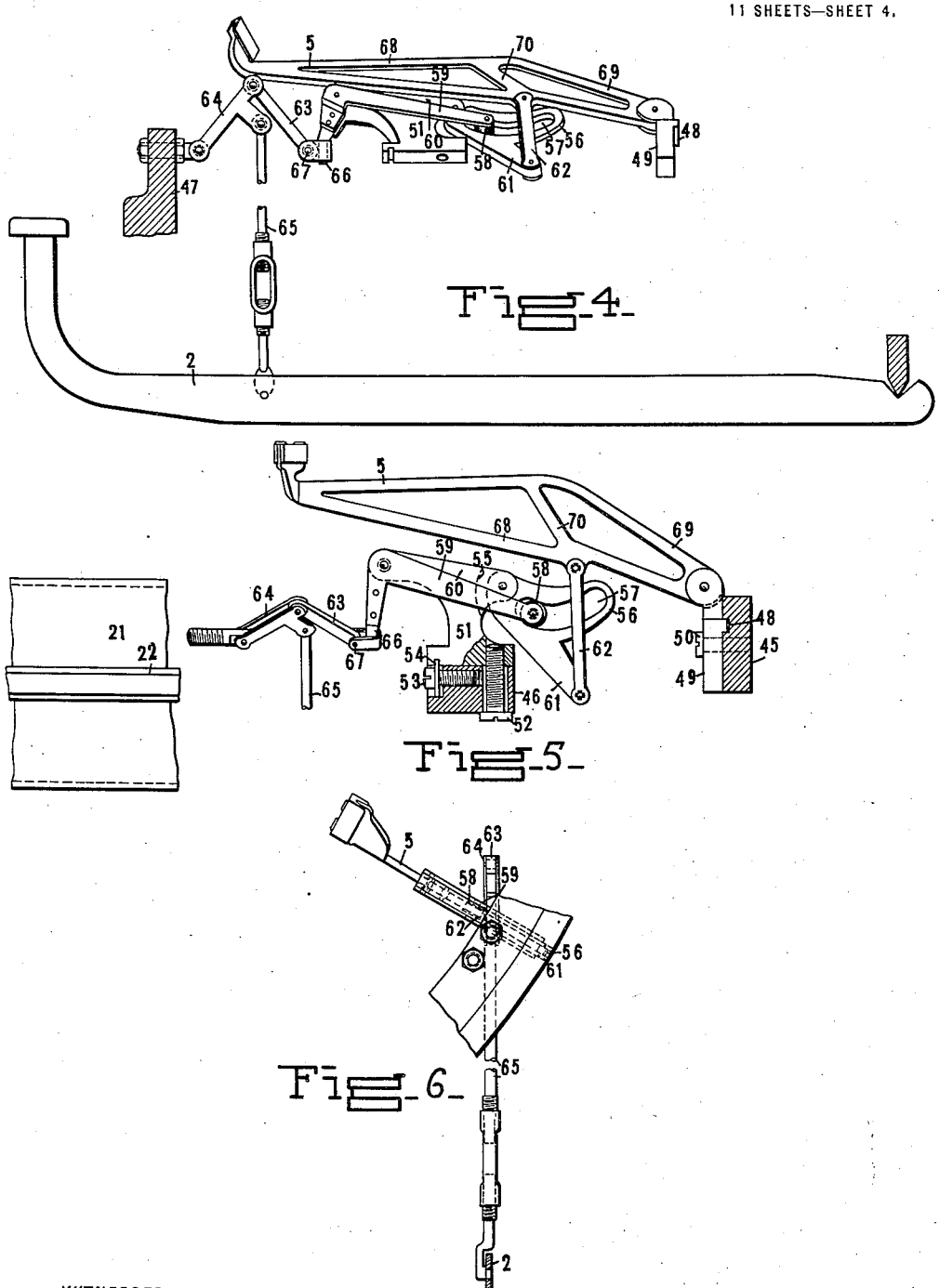

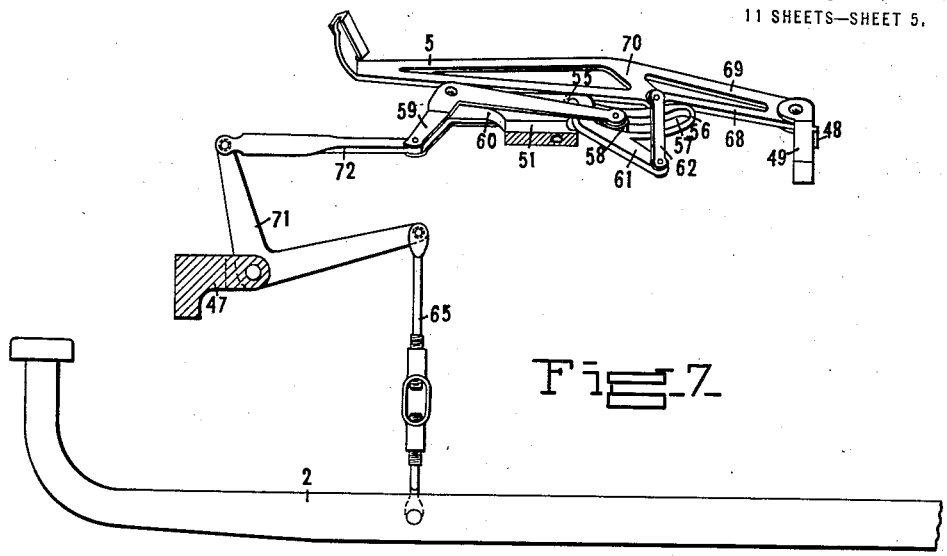
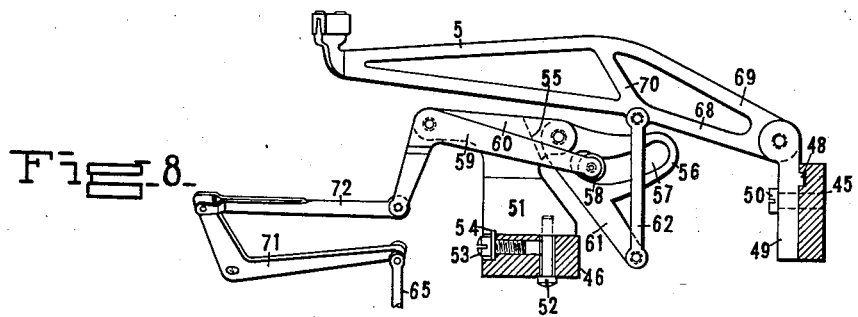
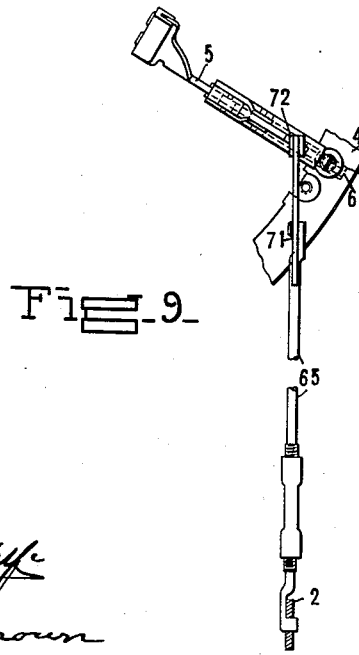

N. H. ANDERSON.
TYPE WRITING MACHINE.
APPLICATION FILED OCT. 8, 1909.
1,312,820.
Patented Aug. 12, 1919.
11 SHEETS—SHEET 6.
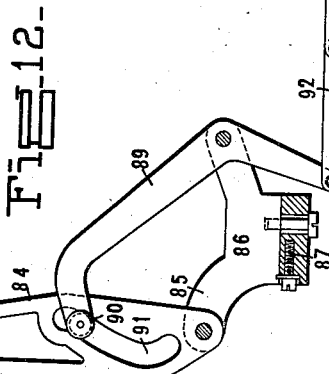
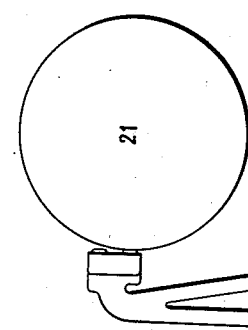
Fig. 12.
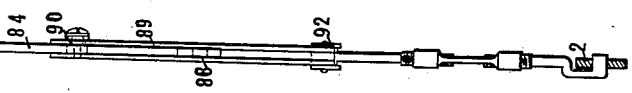
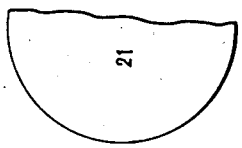
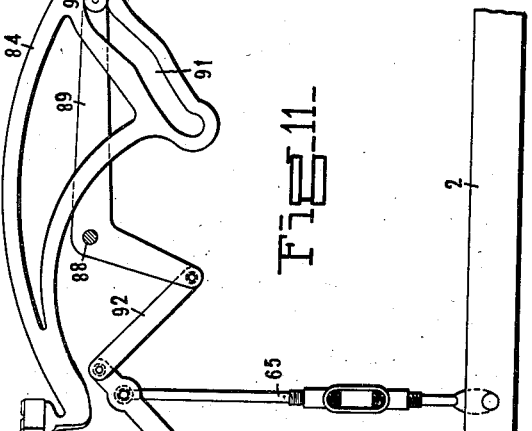
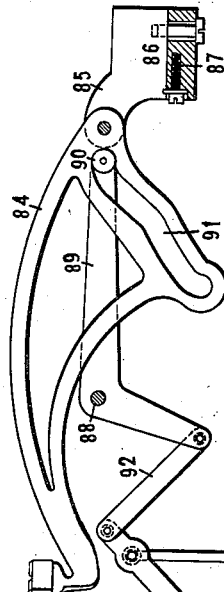
Fig. 13.
Fig. 11.
WITNESSES
INVENTOR
N. H. Anderson
BY
ATTORNEYS

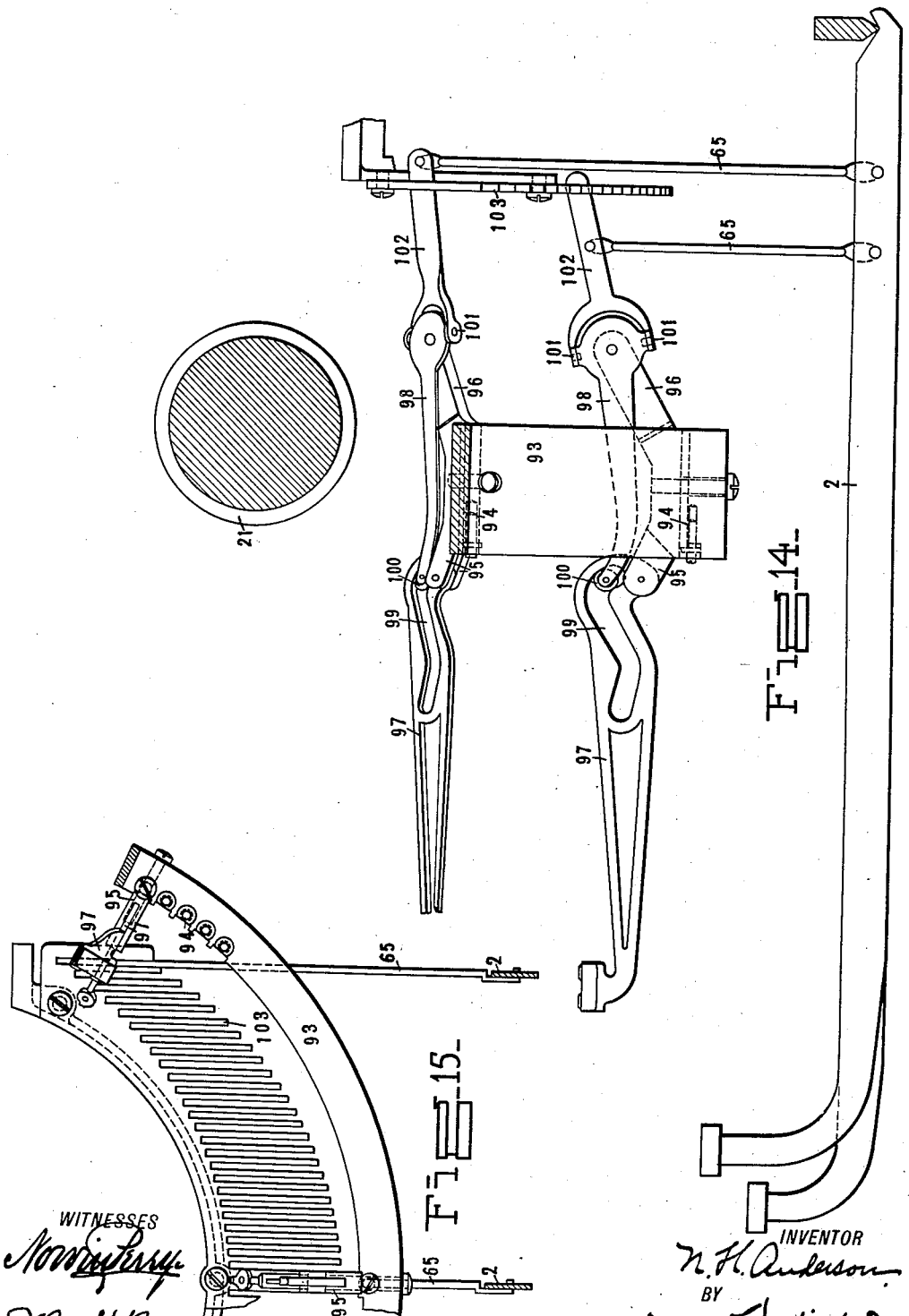

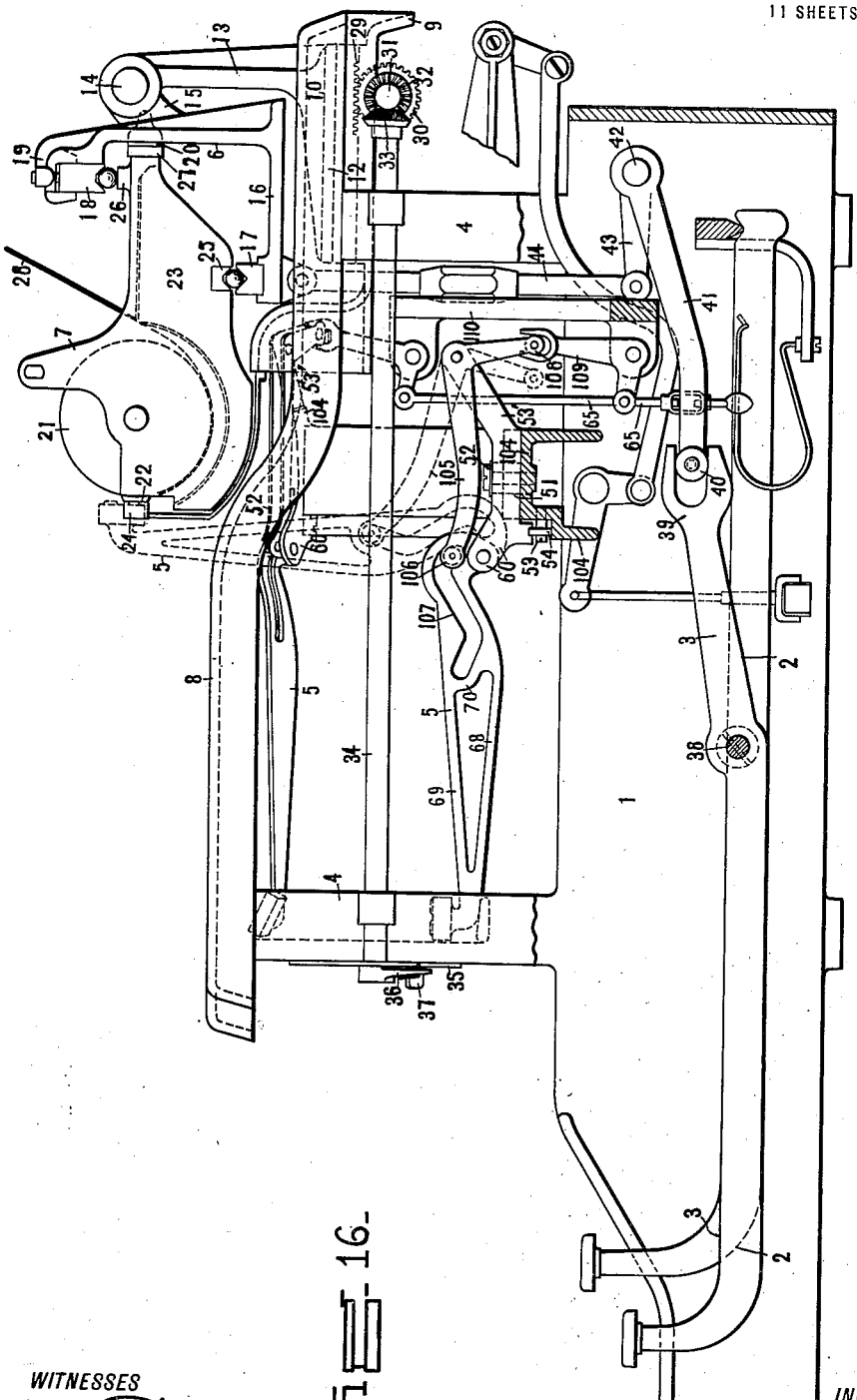

N. H. ANDERSON.
TYPE WRITING MACHINE.
APPLICATION FILED OCT. 8, 1909.
1,312,820.
Patented Aug. 12, 1919.
11 SHEETS—SHEET 9.
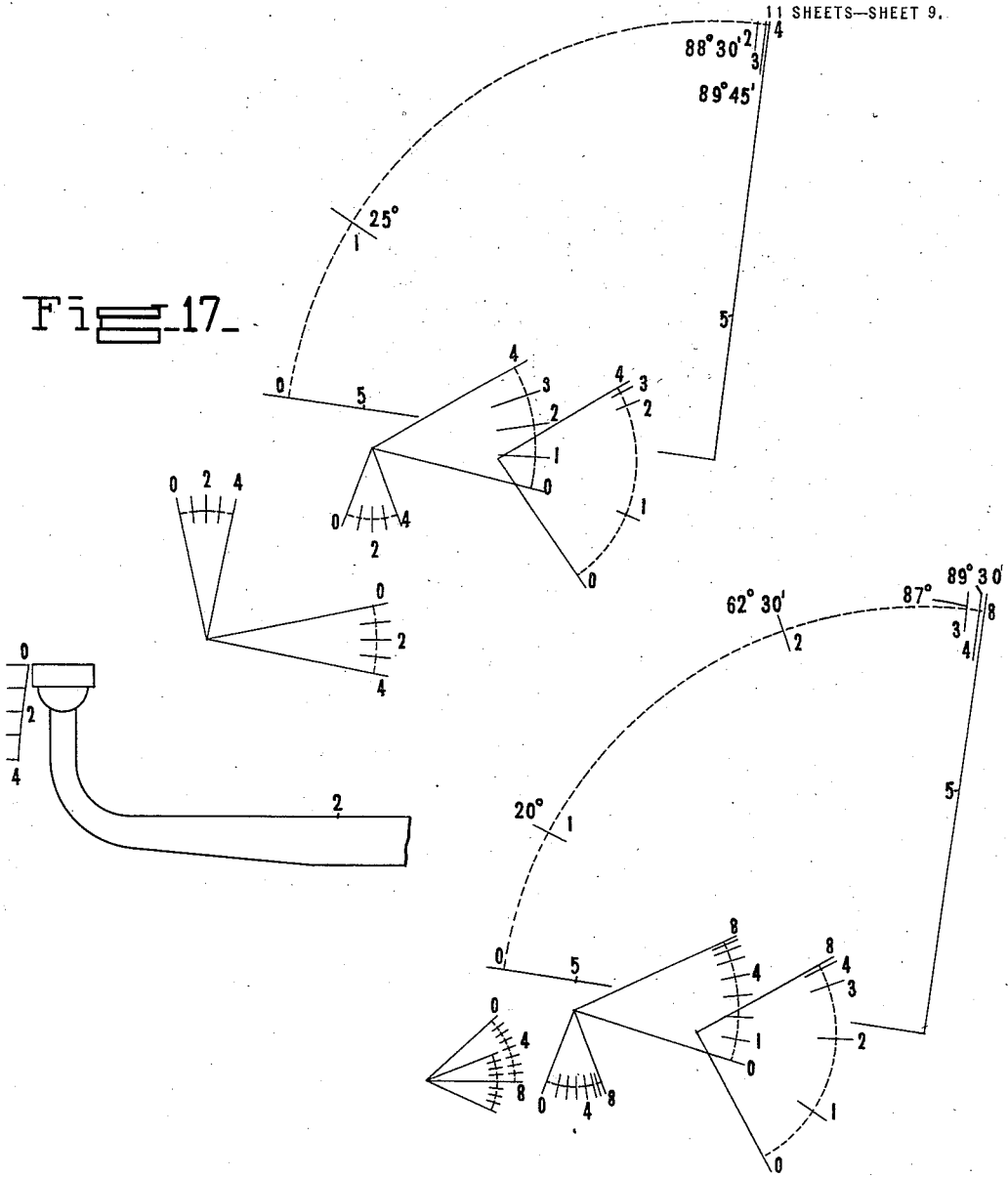
Fig. 17.
Fig. 18.
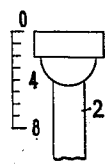
WITNESSES
INVENTOR
N. H. Anderson
BY
Duell, Warfield & Duell
ATTORNEYS

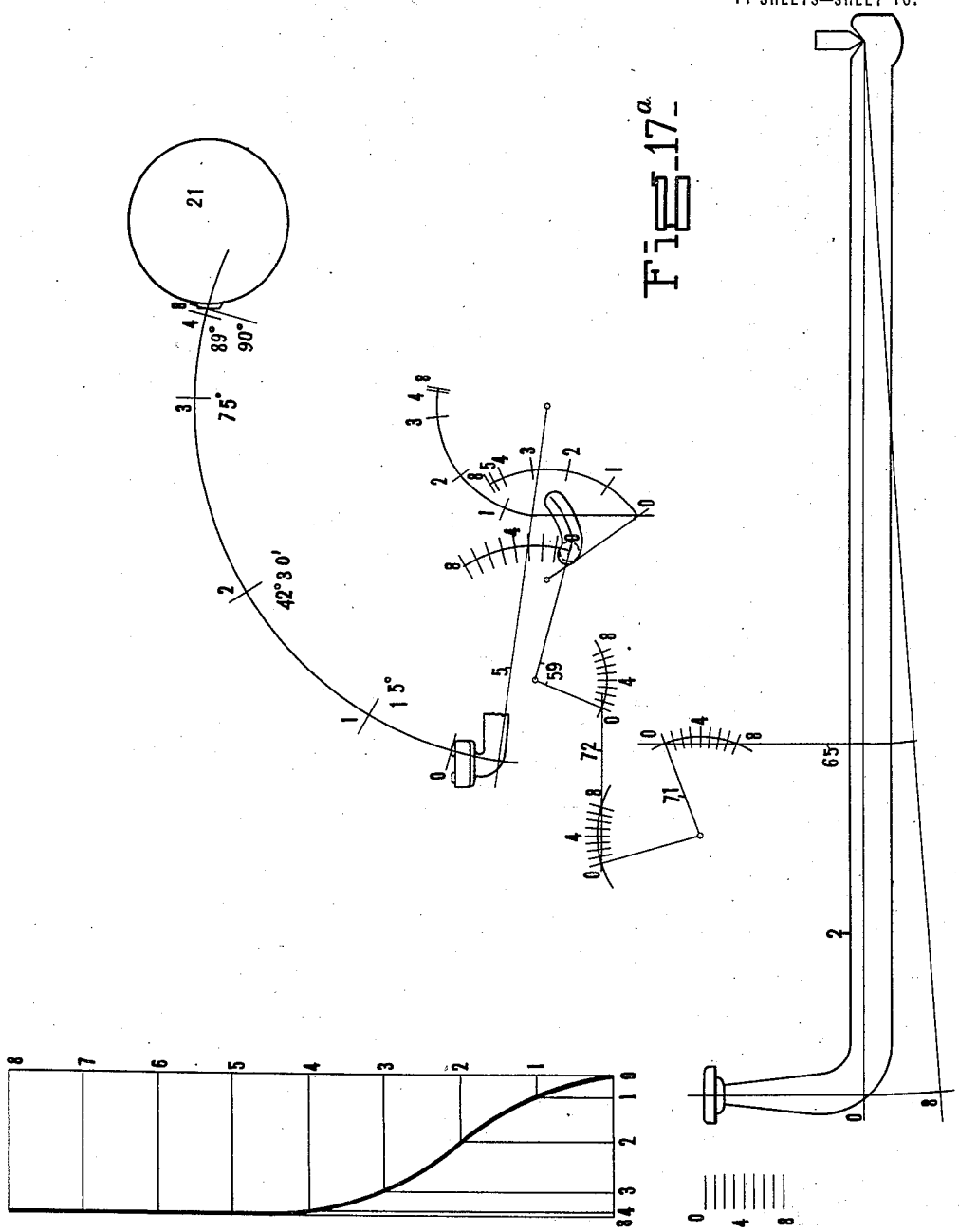

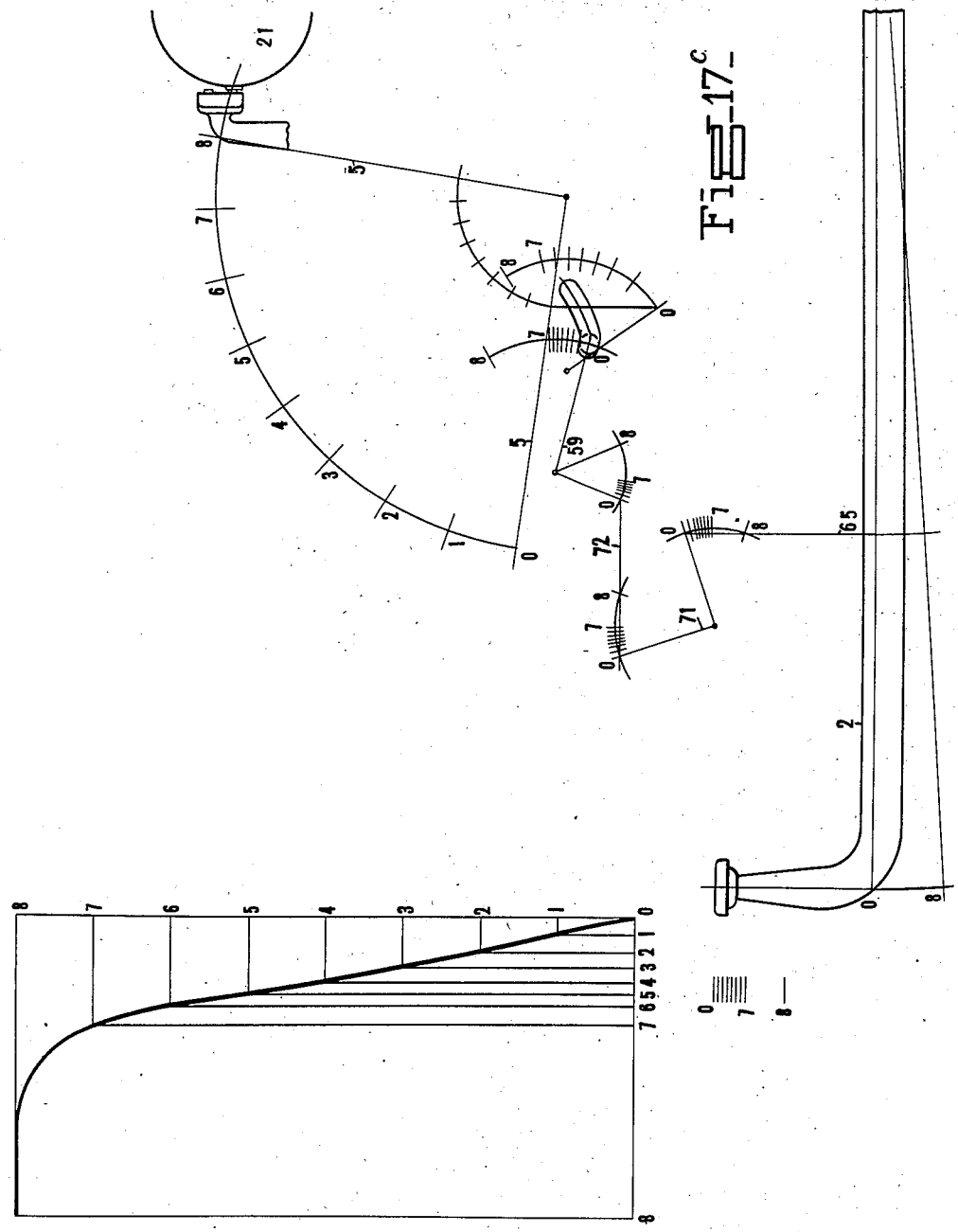

UNITED STATES PATENT OFFICE.

NILS H. ANDERSON, OF MIDDLETOWN, CONNECTICUT, ASSIGNOR TO THE NOISELESS TYPEWRITER COMPANY, OF MIDDLETOWN, CONNECTICUT, A CORPORATION OF CONNECTICUT.

TYPE-WRITING MACHINE.

1,312,820.     Specification of Letters Patent.     Patented Aug. 12, 1919.

Application filed October 8, 1909. Serial No. 521,678.

*To all whom it may concern:*

Be it known that I, NILS H. ANDERSON, a citizen of the United States, residing at Middletown, in the county of Middlesex and State of Connecticut, have invented certain new and useful Improvements in Type-Writing Machines, of which the following is a full, clear, and exact description, such as will enable others skilled in the art to which it appertains to make and use the same.

This invention relates to typewriting machines and more particularly to an easy running machine having the capacity of enabling typewriting to be effected without producing noise. The invention resides more especially in the improved construction of the type-actuating mechanism of such a machine arranged in that general style known as visible front strike.

In such typewriting machines as have hitherto gained commercial supremacy, a pivoted type-carrier or so-called "type-bar" has been arranged to swing into printing position with a hammer-like action so as to utilize the momentum of the printing head through a sharp blow or impact in obtaining the force necessary to produce the desired impression. A hitherto unavoidable concomitant of this mode of operation has been the exceedingly objectionable and penetrating noise composed of the multiplicity of rapidly recurring sharp clicks or reports obtaining at the instant of printing each character. One of the objects of this invention is to so modify, reconstruct, amplify and otherwise improve the structure of such hitherto known machines as to eliminate the said "printing noise" thereof, while at the same time maintaining or utilizing many, if not all, of the advantages otherwise incidental to swinging front strike type-bars. In carrying out this aspect of my invention I propose to so devise the mechanism that such type-bars will make the imprint quietly and noiselessly for all practical purposes by virtue of a compressive or squeezing action, pure and simple, on the material on the platen, as distinguished from the above described pressures derived in consequence of the noisy transformations of the momentum of a type-bar into an effective printing force.

Another object of this invention is to provide an improved arrangement of the type carriers whereby a greater number of carriers may so co-act with a single shift platen as to possess all the advantages of the double shift with but few, if any, of its present disadvantages.

Another object of the invention is to provide an improved action in which the touch and stroke may be graduated as desired.

Another object of the invention is to provide an improved carriage of the single shift style, having means for adjusting the carriage relatively to the type carriers at the end of their normal stroke, and means for shifting the carriage for upper case type.

Other objects and structural characteristics will be in part obvious from the annexed drawings and in part pointed out hereinafter.

The invention accordingly consists in the features of construction, combinations of elements and arrangement of parts which will be exemplified in the construction hereinafter set forth, and the scope of the application of which will be indicated in the following claims.

In the accompanying drawings are illustrated two of various possible embodiments of the invention in a typewriting machine, as well as several possible modifications of type actions.

Figure 1 represents a side elevation of a typewriting machine, partly in section, illustrating one embodiment of various features of this invention.

Fig. 2 is a front elevation of the same with certain parts broken away or shown in dotted lines for clearness.

Fig. 3 is a side elevation of the central type action, shown in Fig. 1, with the type bar or carrier shown in dotted lines in the printing position, and in full lines in its normal position.

Fig. 4 is a side elevation of a side type action similar to that shown at the right-hand of Fig. 2.

Fig. 5 is a side view of the type action shown in Fig. 4 as seen from a slightly different angle.

Fig. 6 is an end elevation of the type action shown in Fig. 4.

Fig. 7 is a side elevation of another form of type action.

Fig. 8 is a side elevation of the type action shown in Fig. 7 as seen from a slightly different angle.

Fig. 9 is an end elevation of the type action shown in Fig. 7.

Figs. 10, 11 and 12, respectively, are side elevations of various other forms of central type actions.

Fig. 13 is an end elevation of the modification shown in Fig. 12.

Fig. 14 is a side elevation of a further form showing a central and side type action.

Fig. 15 is an end view of the type actions shown in Fig. 14.

Fig. 16 is a sectional view of a typewriting machine showing a further modification of type action and its position in the frame.

Figs. 17, 17$^a$, 17$^b$, 17$^c$, 17$^d$ and 18 show diagrammatically the relative movements of the various parts of the form of type actions shown in some of the modifications hereinafter described.

Similar reference characters refer to similar parts throughout the several views of the drawings.

General construction.

Referring first particularly to Figs. 1 and 2 of the drawing, 1 represents the base of the machine, in which are mounted key levers 2, and a shift lever 3, and which carries a superstructure or frame 4, here shown indirectly, supporting type carriers 5, carriage frame 6, longitudinally reciprocating carriage 7 and platen adjusting means.

Mounted on the upper part of the frame is a top plate 8 extending entirely across the front, and from front to rear, of the machine at either side, having a rear transverse connecting member 9, as clearly shown in Fig. 2. On the member 9 is mounted an adjustable block or abutment 10 serving as a backing for the platen to receive the compressive action of the type as will be hereinafter explained. The abutment 10 is provided with a base portion 11 of inverted T-shaped form in cross section, as indicated in dotted lines, Fig. 2, sliding in a groove in the member 9 of the machine. Suitable retaining plates 12 are attached at the sides of the groove, engaging the upper sides of the base 11 of the abutment 10 to normally prevent a removal of the same.

Projecting upwardly from the base 11 are two diverging arms 13 adapted to have pivotal or hinged connections at 14 with arms 15 on the carriage frame.

The carriage frame.

This frame is provided with a suitable base plate 16 extending entirely across the machine, having a lower guide-rail 17 on which the carriage rests, and an adjustable upper guide-rail 18 carried by upwardly projecting arms 19 at the ends of the base plate. Both guide-rails are preferably provided with ball-bearings to permit the free reciprocation of the carriage in its course of travel. A third guide-rail 20 is also provided between the upwardly extending arms 19 adapted to form an abutting surface for reasons that will be hereinafter explained. The carriage frame in normal position, shown in Fig. 1, is adapted, through the connection 14, to have a pivotal movement about the abutment 10 when actuated by the shift mechanism.

The platen carriage.

The carriage comprises, besides the paper roller 21 and non-rotating flat metallic platen 22, a plate 23 at either end thereof supporting the paper roller 21 and suitably connected to form a rigid structure.

The platen 22 is preferably a flat steel or metallic plate having beveled edges extending the entire length of the paper roller (which also serves as a backing for the platen) between the end plates 23, adapted to receive the impression of the type on the paper as the carriage is fed along. The type carried by the type carriers 5 are provided with flat printing surfaces co-acting with this flat platen thereby avoiding the possibility of incurring a blurred copy when manifolding due to a spreading action exerted by the curved surfaces of ordinary type, and, also, imperfect impressions due to the relative increase in diameter of the platen or paper roller with the paper about the same tending to shorten the normal stroke of the type carrier.

A guide 24 is provided adjacent the printing point on the platen 22 and is secured to any convenient and relatively fixed part of the machine, but preferably shiftable with the platen, to insure alinement and, also, to prevent vibration of the type at the moment of contact.

The under side of the carriage is provided with a grooved guide-rail 25 co-acting with ball-bearings on the guide-rail 17 of the carriage frame as above mentioned. The upper part of the carriage is preferably provided with a flat rail 26 to reduce friction, similarly engaging ball-bearings in the upper guide-rail 18 of the carriage frame, the carriage being balanced to act as a lever about the lower guide-rail 17 as a fulcrum. A longitudinal rail 27 extends across the rear of the carriage from the end plates 23, barely engaging the rail 20 of the carriage frame, to avoid unnecessary friction, but permitting the compressive action of the type on the platen to be taken up in a horizontal direction through the paper roller 21, the side plates 23, and the rail 27 to the hinged connection 14 on the abutment 10.

It is, of course, to be understood that the carriage may be provided with any suitable form of paper table, as shown at 28, as well as upper and lower feed rollers and pressure rollers (not shown) to guide the paper and hold the same in place in its movement about the platen or paper roller. The carriage feed and ribbon feed mechanism, which may be of any desired style, are also omitted for the sake of clearness.

The carriage adjusting mechanism.

One of various possible forms of platen adjusting mechanism is shown in the accompanying drawings, and comprises a rack 29 on the base 11 of the abutment 10 adapted to be engaged by a pinion 30 at one end of a shaft 31. This shaft extends partially across the rear and to one side of the frame of the machine, and has at its opposite end a beveled gear 32 meshing with a similar gear 33 carried on a shaft 34 extending to the front of the machine as shown clearly in Figs. 1, 2 and 16. Mounted on the front of the machine and visible to the operator is a suitable dial 35 graduated in a number of equal parts, each part denoting the thickness of an ordinary sheet of paper suitable for use on typewriting machines. On the forward end of the shaft 34 is a pointer or indicator 36 adapted to co-act with the dial 35 and indicate the relative position of the platen with respect to the end of the normal stroke of the type carrier and also the number of sheets of paper best adapted to be printed upon with the parts in that position. A suitable lug 37 is provided on the pointer whereby the same may be conveniently grasped by the operator and moved to rotate the pinion engaging the rack 29 on the abutment so as to move the same forwardly or rearwardly, as desired. The rack and pinion hold the abutment firmly in adjusted position by means of a pin carried by the pointer 36 engaging holes in the dial 35.

Shift mechanism.

Mounted on the base 1 of the machine, and at one side of the key levers 2, is a shift key lever 3 pivotally mounted on a stud 38, projecting from the side of the frame, Fig. 2. The rearwardly extending end of the shift lever 3, or, if preferred, a separate arm movable therewith, is provided with a forked end 39 engaging a roller 40 carried by an arm 41 mounted on a transverse rock shaft 42. Forwardly extending arms 43 are pivotally connected with vertically adjustable shift bars 44 engaging the base 16 of carriage frame 6, so that when the shift key is depressed the shaft 42 will be rotated through the intermediate connections to raise the shift rod and rotate the carriage frame about its connections 14 with the abutment 10 so that the platen will be in position to receive impressions from the type when printing upper case characters.

The operation of these features of the invention will be obvious from the above description.

Action shown in Figs. 1 to 6, inclusive.

On the base of the frame of the machine are mounted a plurality of transverse beams 45, 46 and 47 for supporting the type actions and actuating mechanism hereinafter described. Each of these beams preferably comprises a downwardly curved transverse portion supported at its ends by downwardly diverging legs resting on the base 1. Each beam with its supporting legs is preferably cast integrally so as to form as nearly as possible a rigid structure with the frame of the machine. It is obvious, of course, that these transverse members may be connected with any other part of the machine or supported in a manner other than that above described, although it is believed that the structure as shown is more advantageous. The beam 45 is provided with a longitudinal groove adapted to be engaged by a lug 48 on a block 49 supporting each type carrier 5. The block 49 is secured to the beam in any suitable manner as, for instance, by a machine-screw 50, as shown. The lug and groove connection maintains an accurate alinement of the type.

On the transverse beam 46 are mounted a plurality of adjustable brackets 51, one for each type action. These brackets are preferably secured to the transverse beam 46 by means of a clamping screw 52 threadedly engaging the bracket, but loosely engaging an opening through the transverse beam. At one side of the transverse beam is a second screw 53 provided with a collar 54 adapted to engage a recess in the adjustable bracket. By turning the screw 53, after first loosening the screw 52, it is obvious that a forward and rearward movement of the bracket may be obtained, according to the direction in which the screw is turned. After the bracket is in adjusted position, the screw 52 is tightened thereby firmly clamping the collar 54 between the bracket 51 and the lower part of the transverse beam, as clearly shown in Fig. 1. A construction of this kind positively prevents any dislocation of the bracket to cause an irregularity in the alinement or variation in the effective stroke.

Each adjustable bracket 51 is provided with forwardly and rearwardly projecting arms or portions to which various parts of the actuating mechanism may be connected. On the arm 55 is pivotally mounted an oscillatory cam member 56 provided with a cam slot 57 which receives a roller 58 carried at the end of one arm of a bell crank lever 59 pivotally mounted on the forwardly projecting arm 60. The oscillatory cam member, having a projecting portion 61 is connected by means of a link 62 with the type carrier 5. As the oscillatory cam member 56 is swung around its connection with the adjustable bracket 51 it will be seen that a toggle is formed by means of this projecting portion 61 of the oscillatory cam member and the link 62 between the adjustable bracket and the point of connection on the type carrier, as clearly shown in dotted lines in Fig. 3.

The front arm of the bell-crank lever 59 is pivotally connected with one link 63 of a second toggle. A complementary link 64 is adjustably connected with the transverse beam 47. One of the links of this last mentioned toggle is connected through a vertical adjustable pull-rod 65 with the actuating key lever 2. It will thus be seen that on a depression of the key, the toggle links 63—64 will be extended causing the bell-crank lever 59 to swing about this pivotal connection with the bracket to swing the opposite end carrying the roller 58 upward to bring the type into printing position.

The cam slot 57 in the oscillatory cam member is preferably of a configuration adapted normally to cause a gradually increasing rate of movement during the first portion of travel of the type carrier and a gradually decreasing rate of movement during the latter part, terminating in a relatively slow rate of movement and exerting a compressive or squeezing action of the type on the paper. By means of the double toggle arrangement, as above described, a very heavy pressure may be exerted on the paper and yet the cam slot may be so formed as to bring the type into contact therewith without noise or impact. It is, of course, to be understood that the type carrier is also positively limited in its movement toward the platen, by this mechanism, for it can not possibly move farther than the position attained when the toggle between the adjustable bracket and the type carrier is in extended position. The end of the cam slot, which gives the compressive action to the type, also aids to break the toggles on the return movement of the type carrier and the key bar.

At this point may be briefly noted the desirability of having a rearwardly or forwardly adjustable platen with respect to the end of the normal stroke of the type carrier. Fig. 3, in which the type carrier is projected to the printing position, shows the platen in a relation to the end of the normal stroke of the type carrier suitable to print on one sheet of paper. By moving the platen rearward a predetermined distance a number of additional sheets of paper corresponding to the number indicated on the dial at the front of the machine may be inserted without changing the relative printing point between the type and the paper.

The construction of the type action, shown in Figs 4, 5 and 6, is slightly different from that shown in Fig. 3, by reason of the fact that the actions at either side of the center key are at an angle thereto. The type carrier 5, oscillatory cam member 56 and bracket 51 are substantially the same in general construction, but are mounted at an angle relatively to the normal vertical plane through the printing point. The type on the type carrier 5 are bent to the necessary angle according to the position of the type carrier to make the proper impression. As the toggle formed by the links 63 and 64, the pull-rod 65 and the key lever 2, which are also similar in construction, move in a substantially vertical plane, it is necessary to provide a suitable form of universal connection between these respective groups of elements moving in different planes. This is accomplished by providing on the forward arm of the bell-crank lever 59 a pin 66 bent at an angle to lie in the same plane as the second group of elements. The angle to which this pin is bent varies according to the location of the type carrier toward or from the center of the machine. This pin 66 engages a suitable recess or hole in a member 67 pivotally connected with the rear end of the link 63 of the toggle. It is, therefore, seen that the member 67 will move along a substantially horizontal line having its pivotal movement about the end of the link 63 as the toggle is extended while the arm of the bell-crank lever 59 moves in almost a straight line and in a plane at an angle thereto, having a universal movement through the pin and hole connection. The operation of the bell-crank lever 59 and oscillatory cam member 56 is substantially the same as that described in Fig. 3, the toggle being broken when the key is released by the curvature of the cam and the spring attached to the key lever as shown in Fig. 1 for example.

It may here be noted that the cam slot in the oscillatory cam member positively controls the movement of the type carrier away from the platen as well as its movement toward the platen. In other words, as the movement of the type carrier is gradually increased in velocity during the first part of the movement and gradually diminished during the latter part of its movement toward the platen, the reverse will be true, that is, on the return of the type carrier to normal position, it will have a gradually increasing velocity during the first part of its return and a gradually decreasing velocity during the latter part, thereby tending to insure noiseless and limited return of the type carrier to its normal position of rest.

The type carrier 5, shown in this modification, is preferably of truss form and comprises two side arms 68 and 69, one of which is substantially straight, while the other is bent and connected with the side 68 at its ends. A cross-bar 70 connects the side 68 with the side 69 at substantially the point at which the type bar is connected with the link 62 so as to take up the pressure exerted by the toggle when the same is extended and prevent any bending on the part of the type carrier as it makes the impression.

The entire type bar is preferably made or stamped from an integral piece of sheet metal.

The link 62 as well as the bell-crank lever 59 are preferably made of two similar parts suitably connected at their ends at the point of connection with the adjacent elements in the type action for the purpose, as clearly shown in Fig. 1, of permitting the oscillatory cam member to operate between the sides of these elements.

*Modified action shown in Figs. 7, 8 and 9.*

The action shown in these figures is quite similar to that shown in the modification just described, the main difference being that a second bell-crank lever 71, connected with the bell-crank lever 59 by a link 72, is substituted for the toggle between the key lever 2 and the bell-crank lever 59. The remaining elements, that is, the type carrier 5, oscillatory cam member 56 and adjustable bracket 51, are substantially the same.

The type carrier is of open work truss construction, and the link and bell-crank lever are each composed of a pair of similar parts connected at their ends as previously described.

*Relative ratios between the key-lever and the type-bar.*

In order that the characteristic mode of operation of this invention may be adequately comprehended, it will be conducive to clearness to here explain the effect of the mechanism intervening between the key-lever and the type-bar. Broadly speaking, in a mechanism of this nature there are two propositions involved: 1st, the positive mechanical relationship existing between a type-bar and the key-lever whereby a predetermined ascertainable ratio of movement will exist at each station of the travel of these members; and, 2nd, what may be termed the absolute movement of the type-bar when the key-lever is depressed during the normal operation of the machine. That is to say, there is first a ratio which may, of course, vary from one station to another and yet which will be a constant fraction at any one of these stations. This, of course, does not depend upon the actual instant speed of either of these members, but rather upon the relationship between the speeds of the two members, irrespective of whether they actually have a fast or a slow speed; and, second, there is the question as to absolute speeds and variations therein of the type-bar itself when the machine is being operated in the usual manner, ignoring the manner in which the key-lever is moving. The accurate ascertainment of the first proposition is considerably easier than the determination of the absolute speeds and accelerations or retardations of the type-bar as involved in the second proposition, and, therefore, the question of ratios pure and simple will be now discussed.

Turning now to Fig. 17. it will be perceived that the same diagrammatically exhibits the ratio existing between the key-lever and the type-bar, which diagram has been laid out under the assumption that the key lever has a constant movement, that is to say, move at an even rate and consumes equal intervals of time from one station to another. Thus, when the key-lever is depressed to move it through the arc of swing indicated between the stations 0 and 1, the first intermediate lever will move through another arc having a fixed relation to the first mentioned arc, and so on through the various levers and connections, as shown by the diagram. As will be observed from the diagram, however, while the key-lever has been moved through approximately one-fourth of its arc, the type-bar will have moved a distance somewhat exceeding one-fourth of its total path of advancing travel, that is to say, the type-bar will have moved through an arc of 25 degrees, or about 28 per cent. of its forward path, assuming 90 degrees to be its total path of advancing travel. Of course, these and other ratios are to some extent open to variation. Now, when the key-lever moves through the second quarter of its arc, it will be observed from the diagram that the type-bar has greatly accelerated in motion and has moved through a distance very nearly constituting its total path of travel, i. e., to a point indicated by 88° 30′ (or about 98% of its forward swing). In like manner when the key lever has traveled through three-quarters of the distance of its total arc of travel, the type-bar will have traveled through an arc 89° 45′ (or about 99% of its forward travel). In other words, the movement of the type-bar near the end of its travel has been very slow compared with the movement of the key-lever during a corresponding cycle. These ratios will perhaps be more clearly understood by referring to Figs. 17ª and 17ᵇ, the former showing diagrammatically the ratio existing between the key-lever and the type-bar, and the latter representing this ratio by means of a curve indicating the velocity ratios under the assumption that the key-lever possesses a uniform motion. From this curve, it will be noted that, with respect to the movement of the key-lever, the type-bar starts under such a movement that its inertia will be easily and smoothly overcome, i. e., the key-lever has ample leverage capacity for overcoming the initial inertia and to set the type-bar in motion. Then it will be observed that this motion of the type-bar undergoes a rapid acceleration during practically all of its remaining path of travel; thus reducing the time required for the type-bar to come to printing position, but just before the type-bar nears its printing position, it will be noted that its motion is retarded and almost brought to a stop (when the key-lever has been depressed about one-half). In other words, during the first half of the depression of the key-lever, the type-bar has been quickly brought into position in a mechanically perfect manner, and thereafter the second half of the depression of the key-lever is available for translation into the powerful silent pressure which is utilized in this machine for effecting the printing operation. That is to say, because of the great leverage existing between the key lever and the type-bar during the second half of the movement of the former, it is possible and easy to produce the pressure required for making an impression and yet this pressure is obtained, not by an impact or by arresting the momentum of the type-bar by the platen as has been heretofore done in front strike machines having a swinging type-bar, but by eliminating the inertia or momentum of the type-bar just before the platen is reached, and utilizing the normal pressure of the finger on the key-lever, highly magnified or intensified, for the purpose of producing the printing pressure and thus secure silence and uniformity of action as well as uniformity in the appearance of the printed matter. The efficient, and yet silent, action of this mechanism may perhaps be more fully understood by referring to Figs. 17$^c$ and 17$^d$, which have been laid out on a ratio basis somewhat similar to that of Figs. 17$^a$ and 17$^b$. In the present instance, however, the tabulation is based on the assumption (for purpose of explanation) that the type-bar moves uniformly. Referring to the latter figures, it will be observed that the curve representing the first seven-eighths of the path of the travel of the key-lever, is approximately straight and that thereafter it is sharply deflected; thus showing that the type has very considerable power during the last and most important part of the operation, i. e., producing the printing impression.

Fig. 18 diagrammatically represents the movement ratios existing between the type-bar and the key-lever in the preferred embodiment of this invention. Briefly, it may be observed that, assuming the key-lever to move at a constant rate of speed, the type-bar 5, through the intermediate mechanism, will be moved at an increasing rate of movement during substantially the first quarter of the movement of the key, and a decreasing rate of movement during the second quarter. The third quarter brings the type into position to produce the printing impression, while the fourth quarter exerts a progressive squeezing impression upon the paper, moving the carrier an almost negligible amount. From the standpoint of the ratios of movement, it may be noted that the first quarter of movement of the key-lever will move the type carrier through approximately two-thirds of its distance, the second quarter through nearly the remaining third, while the last two quarters move the type-bar but a small fraction of an inch, or sufficient to effect printing and cause an impression action of the type on the paper. To be more accurate, the number of degrees through which the type carrier moves, as shown by Fig. 18, for the first four $\tfrac{1}{8}$ths and the last half, respectively, are as follows: first $\tfrac{1}{8}$th, 20°; second $\tfrac{1}{8}$th, 42° 30'; third $\tfrac{1}{8}$th 24° 30'; fourth $\tfrac{1}{8}$th, 2° 30', and the last $\tfrac{1}{2}$ for 30', or, in other words, at the end of the first $\tfrac{1}{8}$th stroke of the key lever, the type-bar will have traveled about 22% of its forward stroke; at the end of the second $\tfrac{1}{8}$th stroke, about 70%; third $\tfrac{1}{8}$th stroke, about 97%; fourth, $\tfrac{1}{8}$th stroke, about 99%.

As to the absolute movements of the type-bars, (ignoring the movement of the key lever or other actuating mechanism) it may be stated that such type-bar undergoes an acceleration during its starting movement and quickly attains a high speed, thus bringing it without loss of time to within a very short distance of the platen, at which point its momentum will have been practically all eliminated, and thereafter the type-bar advances comparatively slowly, but under great force, so as to enable it to produce the silent, yet highly efficient, pressure characterizing the work of this machine. The swinging or curvilinear movement of the type carrier is continuous from its retracted limit, i. e., normal position, to its protracted limit, i. e., the extreme position attained in its travel toward the platen. Printing is effected during the final movement of the type carrier in reaching its protracted limit. The full swing of the type carrier is, however, effected without abrupt variation in the speed thereof, without impact between relatively moving parts, and accordingly substantially without noise. In returning, the type-bar undergoes a converse series of movements, and here it may be noted that it comes to rest in its normal position quietly and easily; here also avoiding or eliminating the noise of impact heretofore always present in front-strike typewriting machines.

A comparison of Figs. 17 and 18, which illustrate but two of the various possible embodiments of the invention, will show a slight difference in the rate of movement of the type carriers under different conditions, and having different elements comprising the action. In this manner, that is, by a substitution of elements or by varying the cam slot on the oscillatory cam member, almost any desired motion may be obtained, that is, of course, broadly speaking, one in which the type carrier starts easily and moves a considerable distance 62° 30' during the first quarter of the movement of the key-lever, as shown in Fig. 18, or one that moves the same a less distance 25° during the first quarter of the movement of the key-lever, as shown in Fig. 17.

The above diagrams are presented by way of explanation as showing the possibilities of varying the action without departing from the scope of the invention, and are taken as illustrative of such and not in a limiting sense.

*Modified action shown in Fig. 10.*

Fig. 10 shows a central type action with the type carrier in engagement with the platen and the key depressed. This arrangement, which is slightly different from those previously described, is more compact in its arrangement of parts and is especially adapted to machines of a smaller construction having a platen of the double shift style. Mounted on a transverse beam 73 is a bracket 74 which may be made adjustable, if desired, by an arrangement of parts similar to those illustrated and described in previous modifications. The bracket 74 is provided with a forwardly extending arm 75 to which is directly pivoted the type carrier and a rearwardly extending arm 76, on which is mounted an oscillatory member 77, having a cam slot 78 of a configuration suitable to accomplish the results desired, as above set forth. There is also provided on the bracket a downwardly projecting arm 79, on which is pivoted a link 80, having at one end a roller 81, engaging the cam slot 78 in the oscillatory cam member. The link 80 is connected by the adjustable vertical pull wire 65 with the key lever 2. The oscillatory cam member is provided also with a suitable lug or projecting arm 82, pivotally connected to one end of a link 83, connected at its opposite end to a point near the center of the type carrier. A very powerful, compressive action on the platen by the type is obtained by this construction as will be apparent by reference to this figure. As the cam member 77 swings downward, its pivotal connection with the link 83 tends to form a straight line through the pivot point of cam member 77 on the bracket 74 and the point of connection between the link 83 and type carrier 5. The cam slot is of a configuration to bring these points nearly into alinement and no farther, due to the extension or dwell at the end thereof. The cam slot is preferably of the style above described in connection with the other modifications.

The operation of this construction is as follows:

When the type action is in normal position the oscillatory member 77 is in upright vertical position, the roller 81, carried by the link 80, being at the end of the cam slot nearest the pivot point, the type carrier itself being substantially horizontal. On depressing the key, motion is communicated through the key lever and adjustable pull wire 65 to the link 80 to exert a downward movement thereon. The cam roller 81 tends to swing the oscillatory member 77 downward in traversing the cam slot therein, which, in turn, exerts an upward pull on the type carrier 5, for it is to be borne in mind that at the beginning of the movement, the point of connection between the link 83 and oscillatory member 77 is above the point of connection between the link 83 and the type carrier 5. As the oscillatory member swings downward under the action of the roller 81, the type carrier 5 is swung upward into contact with the platen at a decreasing rate of movement. It is obvious, therefore, that this action is, as are the other modifications, substantially noiseless in its operation.

*Modified action shown in Fig. 11.*

In the modification shown in this figure, the oscillatory cam member is omitted and the cam slot necessary to give the type carrier its desired movement toward the platen to effect a noiseless engagement therewith is preferably made integral with or directly in the type carrier itself when the same is stamped out. The carrier 84 is pivoted to arm 85 of an adjustable bracket 86, mounted on the transverse beam 87. To any relatively fixed portion of the machine such as a transverse bar 88, is pivoted a bell-crank lever 89 having at one end a roller 90 adapted to traverse a cam slot 91, and at the opposite end a pivotally connected link 92 of a toggle adapted to be actuated through the pull wire 65 and key lever 2 in the usual manner. In operation, depression of the key lever tends to extend the toggle, move one end of the bell-crank lever 88 to the rear, consequently raising the opposite end thereof to cause a movement of the type carrier 84 about its pivot, and force the type into impression. As in the other modifications, the cam slot 91 is of the desired configuration adapted to positively control the rate of movement of the type carrier in both directions.

*Modified action shown in Figs. 12 and 13.*

The key action shown in these figures is similar in construction and operation to the modification shown in Fig. 11, but with the parts reversed or behind the type carrier. In Fig. 12 the type is shown in engagement with the platen and the toggle in extended position. The toggle joint is broken when the key is released through the usual spring attached to the key lever, as shown in Fig. 1 for example.

*Modified action shown in Figs. 14 and 15.*

In these figures, Fig. 14 illustrates one of the keys at the side of the machine and a central key action. On a transverse beam 93 of the machine is mounted an adjustable bracket 94, substantially the same in construction as that described in connection with the previous modifications, provided with front and rear arms 95—96, respectively, to one of which is pivoted the type carrier 97 and to the other a movable member 98 for actuating the type carrier. In this modification, as in Figs. 10, 11, 12 and 13, the type carrier is provided with a suitable cam slot 99 to control its movement. The movable member 98 is pivotally mounted on the rear arm 96 and carries at one end a roller 100 adapted to engage the cam slot 99 and at its opposite end trunnions 101, connecting it with a second movable member 102, which, in turn, is connected with the key lever 2 by the pull wire 65, as above described. A comb or other suitable guide means 103, Fig. 15, is provided, adapted to engage the end of the movable member 102 to guide the same in a vertical plane.

In the center action all the parts move substantially in a vertical plane, but the elements of the side actions have different movements which necessitate the pivotal or trunnioned connection above described. The side type carriers swing upward at an angle, as does the movable member 98, while the movable member 102 has a direct vertical movement under the action of the pull wire. In this modification it is advisable to have the movable members 102 of different lengths, for, as the type carriers approach the side of the machine, they have a less actual distance to travel in a vertical plane. As it is, of course, desirable to have the dip of each key lever equal, by placing the connection between the pull wire 65 and the movable member 102 farther from the pivot point, the same dip is provided for and at the same time the movable member is given a less angular motion as required.

The operation of this modification is quite similar to the operation of the previously described modification. On actuating one of the keys the pull wire exerts a downward force upon the movable member 102, which communicates that movement to the movable member 98 causing the roller 100 carried thereby to traverse the cam slot 99 in the type carrier and bring the type to impression. If the type carrier 97 is at the side of the machine, the movable member 102 has a vertical movement under the action of the pull wire 65 and the guide comb 103, while the movable member 98 moves upwardly at an angle corresponding to the movement of the type carrier, permitted by the pivotal connection between the two movable members. As in the other modification, the cam slot is preferably of such configuration as to cause a rapid increasing and decreasing movement up to substantially the point of impression where the compressive or squeezing action takes places under the action of the cam roller and final portion of the cam slot, during the latter part of the movement of the key lever, the printing actually being done before the key lever stops in its downward movement.

*Modified action shown in Fig. 16.*

This action is shown on a complete machine in order that the positioning of the parts on the frame may be fully understood.

For the sake of clearness, Fig. 16 shows only a central action and an extreme side action, the intermediate actions being similar in general construction. On the transverse beam 104 are mounted a plurality of rigidly fixed, but adjustable, brackets 51, one for each type action. Each of these brackets 51 is provided with a forwardly extending arm 60 on which is pivoted the type carrier 5, as in Fig. 1.

Each type carrier is of truss form, that is, having two sides members with a cross member at substantially the point where the force is applied to exert the compressive action of the type on the platen, thereby tending to prevent any bending or vibration of the carrier as the key is depressed as previously described. It is also to be noted that a construction of this style having an actuating point remote from the pivot point will also tend to prevent any vibration of the carrier when actuated.

The bracket 51 is also provided with a rearwardly extending arm 53', on which is pivotally mounted a bell-crank lever 105 having at one end thereof a roller 106 adapted to traverse a cam slot 107 in the type carrier 5. The opposite end of the lever 105 is provided with a roller 108 adapted to engage the forked end of a second bell-crank lever 109 pivotally mounted on a convenient and relatively fixed part 110 of the machine. The lever 105 is preferably composed of two pieces of sheet metal connected at their ends by the pivots of the rollers 106 and 108, and at their center by the pivot point on the arm 53' about which it moves.

Each bracket is provided with mechanism for adjusting or altering the path of travel of the type with respect to the platen. This adjusting mechanism, which is substantially the same as above described in connection with Fig. 1, comprises the bracket 51 having a longitudinal slot through which passes the screw 52, having a threaded engagement with the transverse beam for clamping the bracket firmly thereto in adjusted position.

From the above description, it is obvious that on pressing a key the movement is communicated through the pull wire 65 to swing the upper end of the bell-crank lever 109 forward and raise the forward end of the bell-crank lever 105. The cam slot in the type carrier is of such configuration as to cause an upwardly swinging movement of the type carrier as the forward end of the bell-crank lever carrying the roller engaging the cam slot is raised.

This cam slot may be of any desired shape to give the type carrier a gradually increasing velocity during the first part of its movement and gradually decreasing velocity during the latter part of its movement as heretofore explained.

The mechanism for operating the type carriers at either side of the central type carrier is substantially the same, the main difference being in the length of pull wires.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having described my invention, what I claim as new and desire to secure by Letters Patent, is:

1. In a pressure-printing typewriting machine, in combination, a normally retracted type carrier movable in a continuous curvilinear path to a protracted printing limit, an actuating key therefor, and operative connecting means between said type carrier and said key for effecting a quick transposition of the former to a position adjacent its printing limit and an uninterrupted slow but forcible printing movement thereafter, with but slight and gradual variation in the resistance of said key when operating at a substantially uniform speed.

2. In a typewriting machine, in combination, a pivoted type carrier having a swinging movement to its printing limit, and manually operable means to effect a substantially noiseless printing action of said type carrier by reducing the momentum of the latter without impact prior to its printing movement and thereafter slowly forcing said type carrier through said printing movement.

3. In a typewriting machine, in combination, a platen, a curvilinearly movable type carrier, and means to effect a quick transposition of the latter to a position adjacent its printing limit and at a speed gradually reduced during the final portion of said transposition and thereafter to effect printing movement of said type carrier to a limit governed substantially independently of said platen.

4. In a typewriting machine, in combination, a curvilinearly movable type carrier, and means to effect a quick transposition thereof to a position adjacent its printing limit and at a speed gradually reduced during the final portion of said transposition and thereafter to effect printing movement of said type carrier to a limit governed by said means.

5. In a pressure printing typewriting machine, in combination, a pivoted type carrier, and manually operable means for effecting a continuous swinging movement of said type carrier to its printing limit and effecting printing thereby during the final portion of such movement substantially independently of the momentum of said type carrier, said means including a member transmitting power to said type carrier at a point remote from its axis of motion during the printing movement thereof.

6. In a typewriting machine, in combination, a platen, a pivoted type carrier having a swinging movement, an actuating key for the latter, and operative connecting means between said key and said type carrier for effecting printing movement of the latter to a limit determined substantially independently of said platen, said means including a member transmitting power to said type carrier at a point remote from its axis of motion during the printing movement thereof.

7. In a typewriting machine, in combination, a swinging type carrier having a continuous movement from a retracted limit to a protracted limit, and means to effect said movement without abrupt reduction of the momentum of said type carrier during said movement, said means including a member transmitting power to said type carrier at a point remote from its axis of motion when said type carrier approximates its protracted limit.

8. A typewriting machine comprising, in combination, a swinging type carrier, a platen, an actuating key, and operative connecting means between said type carrier and said key adapted during the final half-stroke of the latter to dissipate gradually substantially all the momentum of said type carrier before the same contacts with said platen and then slowly and powerfully advance said type carrier to produce pressure requisite for printing.

9. In a typewriting machine wherein printing is effected through an inking ribbon, in combination, a platen, a pivoted type carrier mounted to swing freely toward said platen to its printing limit, and actuating and controlling means for said type carrier including means to limit the swinging movement thereof toward said platen substantially independently of the latter.

10. In a typewriting machine wherein printing is effected through an inking ribbon, in combination, a platen, a pivoted type carrier mounted to swing toward said platen to its printing limit, and actuating and controlling means for said type carrier including means to limit the swinging movement thereof toward said platen substantially independently of the latter and without abrupt impact between a moving and a rigid part.

11. In a typewriting machine wherein writing is effected through an inking ribbon, in combination, a platen, a pivoted type carrier mounted to swing freely toward said platen to its printing limit, an inking ribbon positioned for engagement by said type carrier, and actuating and controlling means for said type carrier to limit the swinging movement thereof toward said platen substantially independently of the latter, said means including a member movable a distance greater than the contemporaneous movement of said type carrier while the latter is in engagement with said ribbon for increasing the pressure applied to said type carrier to effect the printing.

12. A pressure printing typewriter comprising the combination of a platen, a pivoted type carrier, an operating key, and connections between the key and carrier adapted to move the carrier continuously but with gradually reduced speed and augmented force just as it approaches the limiting printing position.

13. A pressure printing typewriter comprising the combination of a platen, a pivoted type carrier, an operating key, and connections between the key and carrier adapted to move the carrier continuously but with gradually reduced speed and augmented force just as it approaches the limiting printing position, said connections being also adapted to establish the limit of movement of said carrier substantially independently of said platen.

14. A typewriting machine comprising, in combination, a platen, swinging type carriers each having an actuating mechanism connected therewith, each type carrier having two side bars and an intermediate transverse member connected to one of said side bars at substantially the point at which said type carrier is connected with said actuating mechanism.

15. A typewriting machine comprising, in combination, a flat metallic platen, a swinging type carrier of truss form, a key lever, intermediate connections between the key lever and the central part of the type carrier for actuating the latter to cause a gradually decreasing rate of movement at the end of the path of travel of the type carrier, and type carried by the type carrier having flat printing surfaces adapted to coact silently with said flat platen.

16. A typewriting machine comprising, in combination, a platen, an upwardly swinging type carrier of truss form construction, a point about which said type carrier swings, and actuating mechanism connected with the central part of the type carrier for imparting a variable rate of movement to said type carrier as it moves toward said platen.

17. A typewriting machine comprising, in combination, a platen, a swinging type carrier adapted to have a noiseless contact with said platen, a guide adjacent said platen to prevent vibration of the type carrier at the moment of contact with the platen, means for adjusting the platen relatively to the normal limit of travel of said type carrier, actuating mechanism connected with said type carrier, and means for adjusting said type carrier to alter its limit of travel toward the platen.

18. A typewriting machine comprising, in combination, a platen, a swinging type carrier adapted to have a noiseless contact with said platen, actuating mechanism connected with said type carrier at a point remote from that about which said carrier swings, said actuating mechanism having means for limiting the travel of said carrier, and individual means for altering the limit of travel of said type toward the platen.

19. A typewriting machine comprising, in combination, a platen, a type carrier mounted to swing into contact with said platen, an actuating member, a toggle and a member having a cam surface interposed between said actuating member and said type carrier, and means adapted to traverse said cam surface when said toggle is extended to swing said carrier into contact with the platen.

20. A typewriting machine comprising, in combination, a platen and a plurality of type actions, each action having a type carrier, and an actuating member; a toggle, a bell crank lever, and a member having a cam surface operatively connected in series between said actuating member and said type carrier to transmit impulse from said actuating member to said type carrier.

21. A typewriting machine comprising, in combination, a platen, a plurality of type actions, each action having a swinging type carrier, an actuating member, a toggle between said type carrier and said actuating member, said type carrier being of truss form and having a point at which power is applied forming one point of connection for said toggle.

22. A typewriting machine comprising, in combination, a platen, a swinging type carrier, an actuating member, means interposed between said carrier and actuating member adapted to exert an increasing pressure upon the type carrier as the same approaches the platen, said type carrier being of truss form and having its point of connection with said means near the center of the truss.

23. A typewriting machine comprising, in combination, a platen, a swinging type carrier, an adjustable bracket, an oscillatory cam member mounted on said bracket and connected with said type carrier, a bell crank lever engaging said oscillatory cam member, and means connecting said bell crank lever and said actuating member to move said type carrier toward said platen at a gradually decreasing rate of movement.

24. A typewriting machine comprising, in combination, a platen, a swinging type carrier, a bracket, an oscillatory cam member pivoted to said bracket and connected with said type carrier, means for moving said bracket toward and from the platen, a bell crank lever mounted on said bracket having a part coacting with said oscillatory cam member, and a toggle interposed between one end of said bell crank lever and said actuating means.

25. A typewriting machine comprising, in combination, a plurality of type actions each action having a swinging type carrier, an actuating member, an adjustable bracket, a cam member interposed between said bracket and said type carrier adapted to form a toggle when the type carrier is in printing position, and a second toggle interposed between said cam member and said actuating member.

26. A typewriting machine comprising, in combination, a pivoted type carrier, an actuating member, a transverse beam, a bracket mounted on said beam, an oscillatory member having a cam slot therein, mounted at one side of said bracket, a link connecting said member and said type carrier, a lever mounted on said bracket having a means adapted to engage and traverse the slot in said cam member, and a vertically disposed pull wire connecting said link with said actuating member.

27. A typewriting machine comprising, in combination, a pivoted type carrier, a support therefor, an actuating member, a transverse beam, a bracket mounted on said beam, a bell crank lever mounted on said bracket, separate means carried by said bell crank lever engaging said type carrier, and means intermediate said bell crank lever and said actuating member for conveying movement from one to the other.

In testimony whereof I affix my signature in the presence of two witnesses.

NILS H. ANDERSON.

Witnesses:
SHERMAN M. BACON,
FREDERICK W. GOODRICH.